United States Patent
Flessas

(10) Patent No.: US 11,422,632 B1
(45) Date of Patent: Aug. 23, 2022

(54) SYSTEM AND METHOD FOR PRECISE MULTI-DIMENSIONAL MOVEMENT OF HAPTIC STIMULATOR

(71) Applicant: Andrew Flessas, Columbia, TN (US)

(72) Inventor: Andrew Flessas, Columbia, TN (US)

( * ) Notice: Subject to any disclaimer, the term of this patent is extended or adjusted under 35 U.S.C. 154(b) by 0 days.

(21) Appl. No.: 17/459,082

(22) Filed: Aug. 27, 2021

(51) Int. Cl.
| | |
|---|---|
| *B25J 9/16* | (2006.01) |
| *G06F 3/01* | (2006.01) |
| *A61H 23/02* | (2006.01) |
| *A61H 19/00* | (2006.01) |
| *B25J 19/02* | (2006.01) |

(52) U.S. Cl.
CPC ............. *G06F 3/016* (2013.01); *A61H 19/44* (2013.01); *A61H 23/02* (2013.01); *B25J 19/021* (2013.01)

(58) Field of Classification Search
CPC ......... A61B 34/76; B25J 9/163; B25J 9/1664; B25J 9/1669; B25J 9/162
See application file for complete search history.

(56) References Cited

U.S. PATENT DOCUMENTS

| | | | |
|---|---|---|---|
| 4,868,473 A | 9/1989 | Kato | |
| 5,078,021 A | 1/1992 | Freywiss | |
| 5,596,683 A | 1/1997 | Kasagami et al. | |
| 6,212,784 B1 | 4/2001 | Pittman | |
| 6,807,461 B2 | 10/2004 | Kneifel, II et al. | |
| 7,545,108 B2 | 6/2009 | Flessas | |
| 8,356,704 B2 | 1/2013 | Flessas | |
| 8,896,242 B2 | 11/2014 | Flessas | |
| 8,936,544 B2 | 1/2015 | Shahoian et al. | |
| 9,794,533 B2 | 10/2017 | Flessas | |
| 9,823,693 B2 | 11/2017 | Flessas | |
| 2003/0135203 A1 | 7/2003 | Wang et al. | |
| 2004/0202445 A1 | 10/2004 | DiFrancesco | |
| 2006/0184272 A1 | 8/2006 | Okazaki et al. | |
| 2010/0145512 A1 | 6/2010 | Flessas | |
| 2013/0198625 A1* | 8/2013 | Anderson ............... | G06F 3/016 715/701 |
| 2014/0025202 A1 | 1/2014 | Umeno et al. | |
| 2014/0102239 A1 | 4/2014 | Umeno | |
| 2016/0024781 A1 | 1/2016 | Flessas | |
| 2019/0291277 A1* | 9/2019 | Oleynik ................. | B25J 9/1669 |
| 2021/0092334 A1 | 3/2021 | Flessas | |

* cited by examiner

*Primary Examiner* — Jon Eric C Morales
(74) *Attorney, Agent, or Firm* — Weide & Miller, Ltd.

(57) ABSTRACT

A robotic haptic stimulator comprises a robotic mount which is configured to move a haptic stimulation device. The robotic mount can preferably move the haptic stimulation device in three-dimensional space. Movement in the x, y and/or z directions may be independently controlled and may be referenced to a designated point or position that may be associated with the human body. Lidar may be used to obtain information regarding the location/distance of one or more parts of a user for use in controlling the position of the haptic stimulation device. Movement of the haptic stimulation device may emulate movement of other objects and/or be synchronized to video or sound.

15 Claims, 4 Drawing Sheets

SYSTEM AND METHOD FOR PRECISE MULTI-DIMENSIONAL MOVEMENT OF HAPTIC STIMULATOR

FIELD OF THE INVENTION

The present invention relates to haptic stimulation devices.

BACKGROUND OF THE INVENTION

A variety of haptic stimulation devices are known. These devices may be used for a variety of purposes. In some cases, the devices are general purpose, and in others, specific purpose. For example, such devices may be general purpose, such as configured for pain relief or treatment, such as to treat tired or sore muscles, improving circulation and the like. The devices may also be specific purpose, such as for use in sexual stimulation or other purposes.

In some cases, the haptic stimulators may comprise objects which have no moving parts. In that event, the user is generally required to manually manipulate the stimulator. For example, the haptic stimulator might be as simple as a ball. The user might use their hands to press and roll the ball on their body, such as against their skin over the area of a pulled muscle.

Other haptic stimulators have moving elements. The moving element may be manually movable, such as by the user, or may be self-powered. For example, users often use rolling pins on sore muscles by grabbing handles at each end of the rolling pin and then moving a center rollable portion back and forth over the area of the affected muscle. As another example, tissue guns may be electrically powered and include one or more motors for moving a head portion of the gun, such as to cause the head portion to vibrate. The user still then has to manually grasp the gun and manually place the head of the gun into contact with the desired area.

Other motorized haptic stimulation devices are known, such as disclosed in U.S. Pat. No. 8,936,544. This device includes motor driven actuators for moving a ring and constricting or relaxing a ring. However, the device still must be manually located, and the powered motions or movements of the devices are limited, at least when trying to mimic sex.

An improved method and device is desired for precisely moving a haptic stimulator is desired.

SUMMARY OF THE INVENTION

Aspects of the invention comprise a system and method for controlling the position of a haptic stimulation device, including automatically moving the haptic stimulation device.

In one embodiment, a robotic haptic stimulator comprises a robotic mount which is configured to move a haptic stimulation device. Preferably, the robotic mount can preferably move the haptic stimulation device in three-dimensional space. Movement in the x, y and/or z directions may be independently controlled and may be referenced to a designated point or position.

In one embodiment, programs comprising a data set of x, y and z coordinates in relation to time may be utilized by a controller of the robotic haptic stimulator to control the movement of the robotic mount, and thus the haptic stimulation device. The data sets may be generated by independent x, y and z functions. In one embodiment, the functions may have different time durations, wherein one or more of the functions may be repeated, causing changes in the motion of the robotic mount over time.

In one embodiment, movement of the robotic mount is controlled relative to a designated point or position, such as a reference point. The reference point might comprise, for example, a location on a user's body.

In order to determine the reference point, LIDAR or similar technology may be used to obtain information regarding the location/distance of one or more parts of a user. The user might select a position from a LIDAR map of their body (or portion thereof). The position functions may be used to generate x, y and z position data relative to the designated reference point.

In some embodiments, movement of the haptic stimulation device may emulate movement of other objects and/or be synchronized to video or sound.

The robotic haptic simulator may communicate with one or more external devices or networks. For example, in one embodiment, a user may communicate with the robotic haptic simulator via a mobile communication device. The user may, for example, utilize a graphical user interface displayed by the device and one or more input devices of the mobile communication device in order to select desired programs of movement, modify or create new programs of movement and the like.

Additional aspects of the invention comprise a robotic haptic stimulation device stop or freeze function, and a user authentication and/or consent function.

The robotic haptic stimulator may be utilized to control the movement of various haptic stimulation devices, including those which themselves are designed to move. The robotic haptic stimulator may, for example, be used to move one or more haptic stimulation device for treatment of muscles or for medical reasons, or to provide pleasure, such as when used to provide simulated sexual functionality.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises systems, methods, and devices for moving haptic stimulators, and preferably for providing precise control over the location and/movement of a haptic stimulator relative to a human. One embodiment of the invention comprises a robotically controlled or robotic haptic stimulator. Additional embodiments of the invention comprise methods of controlling the robotic haptic stimulator, including controlling the location and movement thereof.

Figure 1:
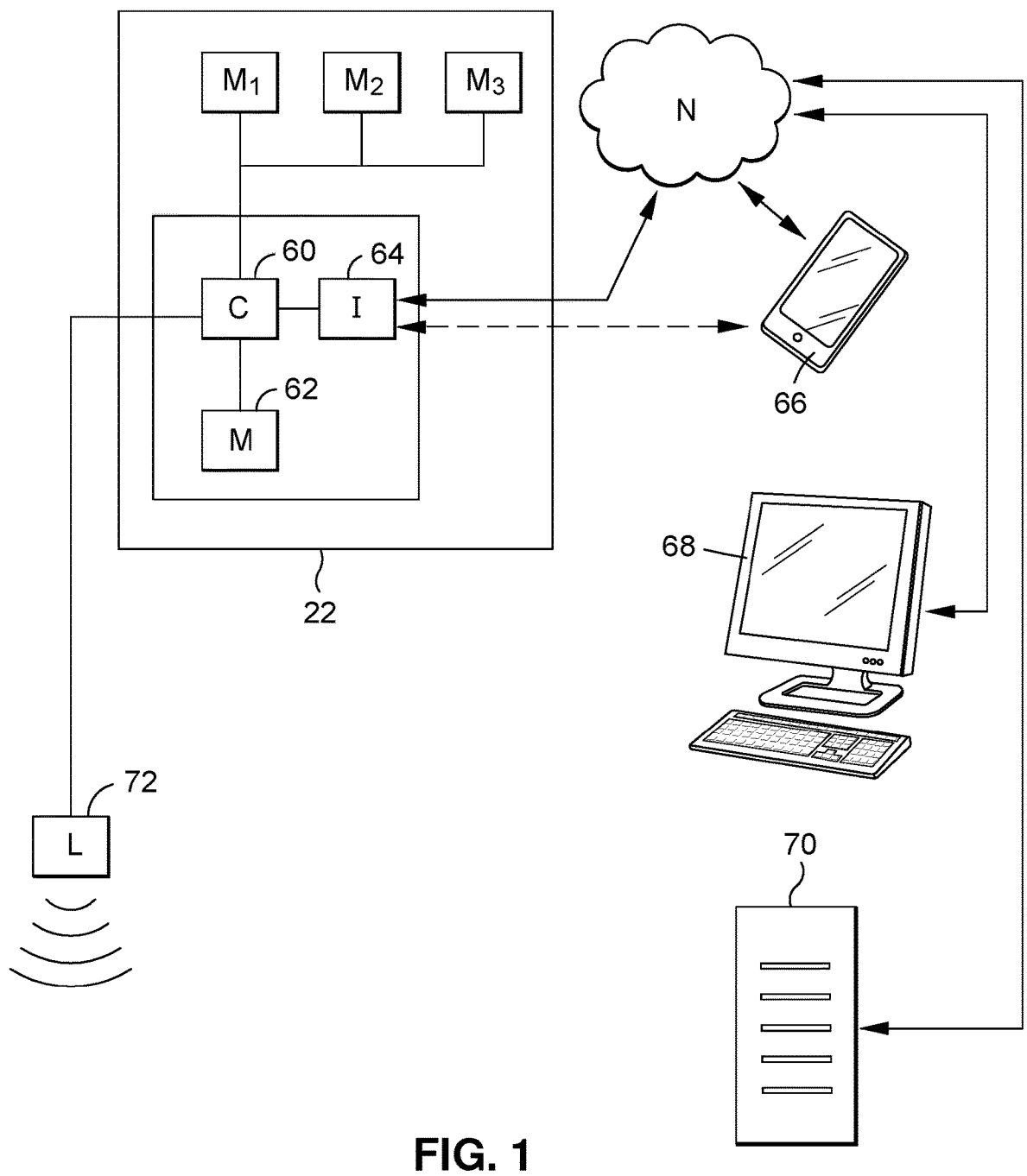
FIG. 1 illustrates a system in accordance with an embodiment of the invention.

FIG. 1 illustrates a system 20 in accordance with an embodiment of the invention. In one embodiment, the system 20 includes at least one robotic haptic stimulator 22.

The robotic haptic stimulator 22 is moveable, thus permitting the position of an associated haptic stimulation device 24 (see FIG. 2) to be changed. As detailed below, in a preferred embodiment, the robotic haptic stimulator 22 can be used to change the position of the haptic stimulation device 24. In a most preferred embodiment, the robotic haptic stimulator 22 can be used to change the position of the haptic stimulation device 24 freely in three-dimensional space.

In a preferred embodiment, the robotic haptic stimulator 22 is referred to as "robotic" because it is a device which can change positions in an automated fashion. In particular, the robotic haptic stimulator 22 is preferably capable of multiple movements without manual intervention (i.e. can move between various positions based upon a sequence of instructions without each movement being prompted by individual user input).

Figure 2:
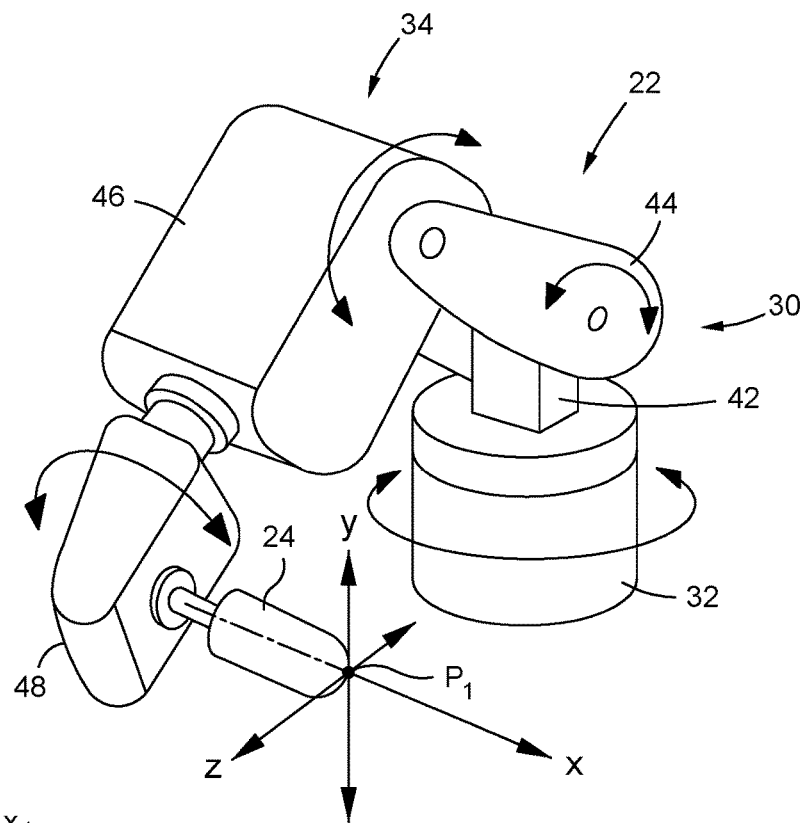
FIG. 2 illustrates a robotic haptic stimulator in accordance with an embodiment of the invention.

Referring to FIG. 2, the robotic haptic stimulator 22 preferably comprises a robotic mount 30 which is movable so that an associated haptic stimulation device 24 is linearly moveable in three (3) directions or along three (3) axis which are orthogonal to one another, and/or in combinations of those directions, including rotationally around those axes. For example, the robotic mount 30 may comprise 6-axis robot.

For example, as illustrated in FIG. 2, the robotic mount 30 may be configured to move a haptic stimulation device 24 linearly in an "x" direction, a "y" direction and a "z" direction, as well as combinations thereof (e.g. in a direction which is in both an x and y direction, y and z direction, etc.), whereby the robotic mount 30 is capable of moving the haptic stimulation device 24 freely in three-dimensional space. Further, the robotic mount 30 may be capable of rotational movement about one or more of such axis, such as about the x, y, and/or z axes (or such rotation might be accomplished via the linear movements). In this manner, the robotic mount 30 may manipulate the haptic stimulation device 24 to move in any combination of linear and rotational movement.

In one embodiment, the robotic mount 30 comprises a base 32 and a movable support or mount 34. The base 32 is configured to support the movable mount 34, and the movable mount 34 is preferably moveable relative to the base 32, thus permitting an associated haptic stimulation device 24 (which is connected to or supported by the mount 24), to be moveable.

Referring to FIG. 2, the base 32 may have a variety of configurations, including various shapes and sizes. In general, the base 32 is configured to be mounted to or supported by (by connection or merely resting or setting upon) a support surface, such as a wall, floor or other support, such as a portion of another object. The base 32 may have a generally planar bottom or lower surface for engaging a generally planar support surface, or may have other configurations for engaging support surfaces of other shapes. In one embodiment, the base 32 may include one or more apertures for accepting fasteners which are placed into engagement with the support surface, for securing the base 32 in a fixed position by temporarily or permanently connecting the base 32 to that surface. As described below, however, the entire robotic mount 30 may be movable, such as by having a base which is movable relative to a support surface, including by rolling or walking. In the embodiment illustrated, the robotic mount 30 is located on a horizontal supporting surface, but it could be mounted upside down, to a vertically extending support, etc.

In a preferred embodiment, the moveable support 34 is positioned between the base 32 and the haptic stimulation device 24. This support is preferably moveable in at least three (3), and preferably six (6) degrees of freedom, and is thus moveable in at least two (2), and more preferably three (3), dimensions or dimensional space. As indicated above, the robotic mount 30 preferably at least allows the haptic stimulation device 24 to be rotated. In a preferred embodiment, however, movement is permitted linearly relative to each of three generally orthogonal axis (as well as combinations thereof), as well as rotationally around each axis. As disclosed below, the movable support 34 may permit redundant movement in one or more directions. For example, the movable support 34 may include two or more elements which permit it (and thus an object connected thereto, such as a haptic stimulation device 24) to be moved in the x, y and/or z direction (three degrees of freedom), and to rotate about the x, y and/or z axis (3 additional degrees of freedom), or various combinations thereof.

As illustrated, in one embodiment, the mount includes a main support 42. In one embodiment, the main support 42 is mounted for rotation relative to the base 32, i.e. about the y-axis as illustrated in FIG. 2. The main support 42 may be mounted, for example, on a bearing supported shaft which is connected to the base 32, or by other means. This mounting allows the main support 42 to rotate about the y-axis as illustrated in FIG. 2.

In one embodiment, a lower arm 44 is rotatably mounted to the main support 42. As illustrated, the main support 42 has a first portion mounted to the base 32 and a second portion to which the lower arm 44 is mounted. In a preferred embodiment, the lower arm 44 is rotatably mounted to the main support 42 about a shaft or other mount. In the configuration illustrated, the lower arm 44 is mounted for rotation about an axis which is generally perpendicular to the axis about which the main support 42 rotates (such as the x or z axis, depending upon the orientation of the main support 42).

As further illustrated, an upper arm 46 is rotatably mounted to the lower arm 44. In one embodiment, a first or distal portion of the lower arm 44 is mounted to the main support 42, and the upper arm 46 is mounted to a top or proximal portion of the lower arm 44. In one embodiment, the upper arm 46 is also mounted for rotation about an axis perpendicular to the axis of rotation of the main support 42, such as the x/z axis.

In one embodiment, a head 48 is located at a distal portion of the upper arm 36. Preferably, the haptic stimulation device 24 is mounted to the movable mount 34 via the head 48. In one embodiment, the head 48 is mounted for rotation relative to the upper arm 46 (and thus the remainder of the movable mount 34).

The various portions of the movable support 34 may be connected to one another (and to the base 32) in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the movable support 34 might be mounted to one another in other fashions, however, such as by hinged mounting or the like.

Preferably, the movable support 34 includes means for moving the one or more portions thereof, and thus the haptic stimulation device 24 connected thereto. As illustrated, the movable support 34 may include one or more motors M for moving the components thereof. The motors may be electrical motors. In other embodiments, hydraulics or other means may be utilized to move one or more of the components of the movable support 34. For example, a hydraulic arm might be utilized to move the upper arm 46 relative to the lower arm 44 in an up and down direction.

Of course, the robotic mount 30 might have various other configurations. For example, while the robotic mount 30 described above is redundant in its capacity to move in certain directions, the robotic mount 30 could be configured in other fashions (such as by having only a single portion configured to move in each direction). It will also be appreciated that the number of members or elements which the movable support 34 comprises may vary. For example, the robotic mount 30 might comprise a base and a head which is mounted to the base, such as via a swivel, permitting the head to be moved in at least two dimensions. Various configurations of members may also be utilized to allow movement in various directions. For example, aside from swivels or the rotating connections of the movable mount illustrated in FIG. 2, members may be configured to telescope, slide or otherwise move linearly (i.e. move along an axis rather than about an axis), or be configured to move along paths other than curved paths. For example, an arm might be rotatably connected to a base, where the arm is telescopic and can thus be extended or retracted.

As another example, the entire robotic mount 30 may be movable. For example, the robotic mount 30 might be movable in one or more directions via wheels riding on a track (not shown) or otherwise, including where the wheels may rotate, thus allowing the robotic mount 30 to rotate or spin, or might be configured to move in one or more directions by walking (such as by including one or more legs).

As indicated, in a preferred embodiment, the robotic mount 30 is configured to move at least one haptic stimulation device 24. In one embodiment, the haptic stimulation device 24 is directly attached to the movable support 34, such as to the head 48. In general, the robotic mount 30 has a portion (such as the head 48 or an element connected thereto) which is moveable in the manner described above (as indicated above, in one embodiment, movement of the various portions of the movable support 34 allow the head 48 to be moved in three (3) generally orthogonal directions and combinations thereof, as well as rotationally about those directions) and is thus configured to move an associated haptic stimulation device 24.

The haptic stimulation device 24 might comprise various elements, objects and/or devices which are used to stimulate the senses of a user, such as the senses of touch and/or motion. The haptic stimulation devices 24 may thus themselves comprises static objects or have moving or movable portions. For example, the haptic stimulation device 24 might comprise a spherical or generally spherical shaped object, a cylindrically shaped object, etc. (that, for example, can be moved into contact with a user to stimulate the sense of touch, and when moved relative to a user, may stimulate the sense of motion). The haptic stimulation device 24 may be constructed from one or more materials, including various plastics, rubber, foam, etc. The construction and shape of the haptic stimulation device 24 may vary depending upon the desired usage. For example, when used for sexual stimulation, the haptic stimulation device 24 may be configured as a dildo (e.g. penis shaped) or may emulate a vagina, etc. Further, the haptic stimulation device 24 might itself have various moving parts or elements, such as to cause the haptic stimulation device 24 to vibrate, etc.

The haptic stimulation device 24 may be interchangeable (e.g. be connected to and disconnected from the robotic mount 30). For example, the head 48 may include a mount which facilitates the connection and disconnection of different haptic stimulation devices 24. For example, the head 48 might include either a threaded female aperture or a thread male rod or other mount, for compatible connection of a mating female or male connector associated with a haptic stimulation device 24. Of course, various means may be utilized for mounting or connecting the haptic stimulation device 24 to the robotic mount 30 (and preferably allowing the haptic stimulation device 24 to be removed therefrom). In one embodiment, the robotic mount 30 may thus permit the attachment of various haptic stimulation devices 30 which are themselves already available in the marketplace.

Referring again to FIG. 1, in one embodiment, the system 20 includes means for controlling the robotic mount 20. This means may comprise a controller or processor 60. The controller 60 may be part of the robotic haptic stimulator 22, or might be external thereto (such as part of a remote computing device). In one embodiment, various instructions may be provided to the controller 60 to cause the controller to cause the robotic mount 30 to move. For example, a user might provide an input to the controller 60, which input is a request to move the haptic stimulation device 24 from a first to a second position. The controller 60 may generate one more signals or instructions which are transmitted to the robotic mount 30 to so move the haptic stimulation device 24. The signal might comprise opening of a switch which allows electricity to flow to one or more motors M of the robotic mount 30 for a predetermined period time which is necessary for the motor to affect the desired movement. In another embodiment, the signal might comprise an instruction which is received by sub-controller of the robotic mount 30, which sub-controller then causes the mount to move as desired.

As indicated, the controller 60 may comprise a processor which is capable of executing machine readable code or software, such as stored in a memory 62 in association with the processor. As indicated, that software may comprise a set of instructions which, when executed, cause the controller 60 to move the robotic mount 30.

The software might also or instead simply comprise a set of instructions which permits a user to provide input of desired movement (e.g. which allows the user to "program" the robotic haptic stimulator 22 to move, either in direct response thereto or to generate a programmed movement (which may be implemented immediately or be stored for implementation at a later time)).

In one embodiment, the instructions may be generated remotely and uploaded to the robotic haptic stimulator 22, such as by a communication interface 64. The communication interface 64 may permit wired and/or wireless communications to and/or from the robotic haptic stimulator 22 and one or more remote devices. For example, as illustrated in FIG. 1, the robotic haptic stimulator 22 might be configured to directly communicate with one or more devices, such as via Bluetooth, Wi-Fi or other communication links and protocols. In other or additional embodiments, the robotic haptic stimulator 22 might be configured to communicate with one or more devices via one or more networks N. Such networks N may have various configurations and have wired or wireless links. For example, the network(s) N might comprise a LAN or WAN, might comprise the Internet, a cellular or radio network, etc.

In one embodiment, the robotic haptic stimulator 22 may be configured to communicate with a user device 66, such as a user's mobile phone, laptop, tablet, PDA or other mobile communication device. In one embodiment, such a user device 66 includes at least one user input (buttons, touch screen, etc.), at least one display such as a video display, and preferably includes a processor, such as for processing information to be displayed on the display (whether obtained remotely or generated at the device). The user device 66 may include a memory for storing machine-readable instructions, such as one or more "applications" which may be run on the user device 66.

The one or more remote devices might also comprise one or more workstations 68, such as a desktop computer which has one or more user input devices (such as a mouse, keyboard, touch-screen or the like) via which the user may provide input, a controller or processor, a memory for storing machine-readable code or other data, and a user display device.

The one or more remote devices might also comprise one or more servers 70 or other systems. The server(s) 70 might also comprise computing devices which include a controller or processor, a memory for storing machine-readable code, and the like.

Aspects of methods of moving the haptic stimulation device 24 via the robotic mount 30, including via a system 20 such as described above, will now be described.

In one embodiment of a method, the position of the haptic stimulation device 24, including its orientation, is controlled, such as via a robotic mount 30. In one embodiment, as described above, the position of, and movement of, the haptic stimulation device 24 is determined by the robotic mount 30, which is itself determined by instructions executed by (including data generated by) the controller 60.

Figure 3:
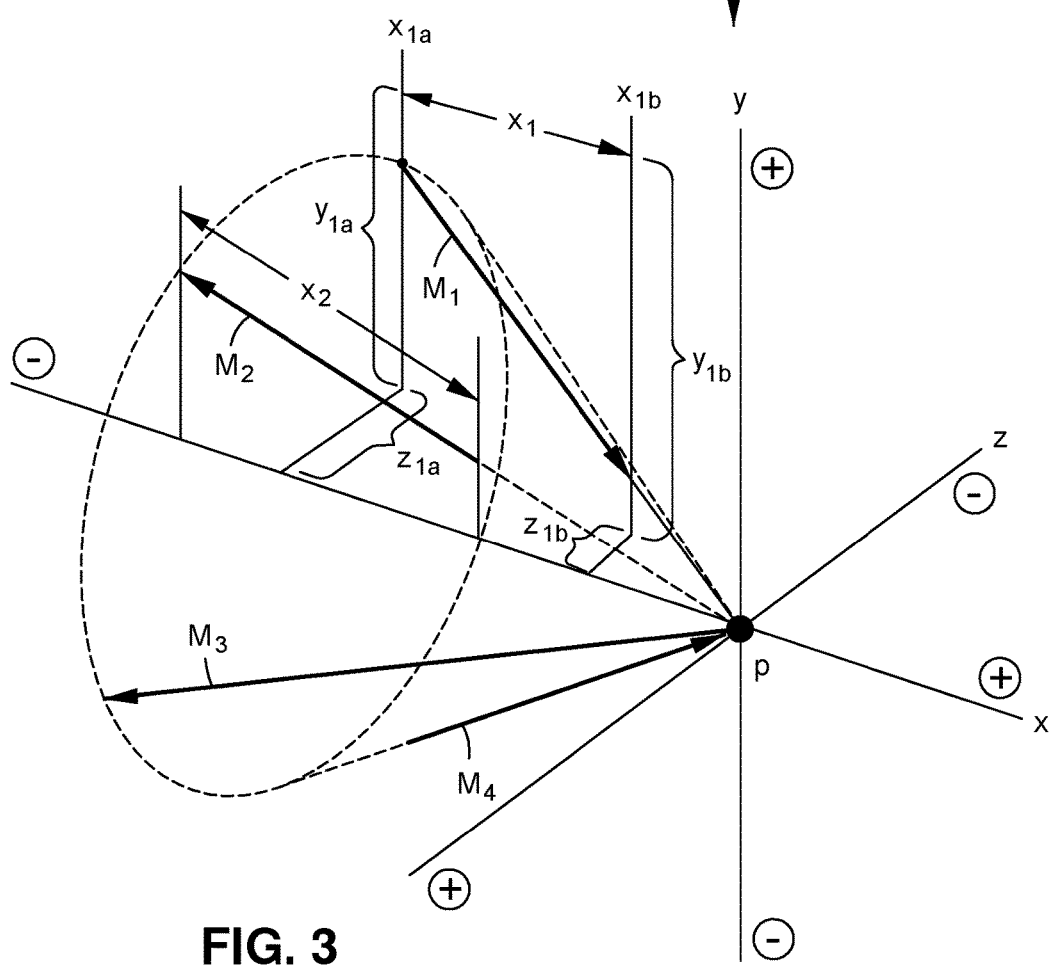
FIG. 3 graphically illustrates aspects of movement of a haptic stimulator in accordance with the invention.

In one preferred embodiment of the invention, and referring to FIG. 3, movement of the haptic stimulation device 24 is with reference to a point P. This point P preferably comprises a reference point. The point P may be determined in various manners. For example, the point P might be determined via a detection system, as described below. In one embodiment, the point P may comprise a location associated with a human body, such as a contact point with a human body.

Figure 4A:
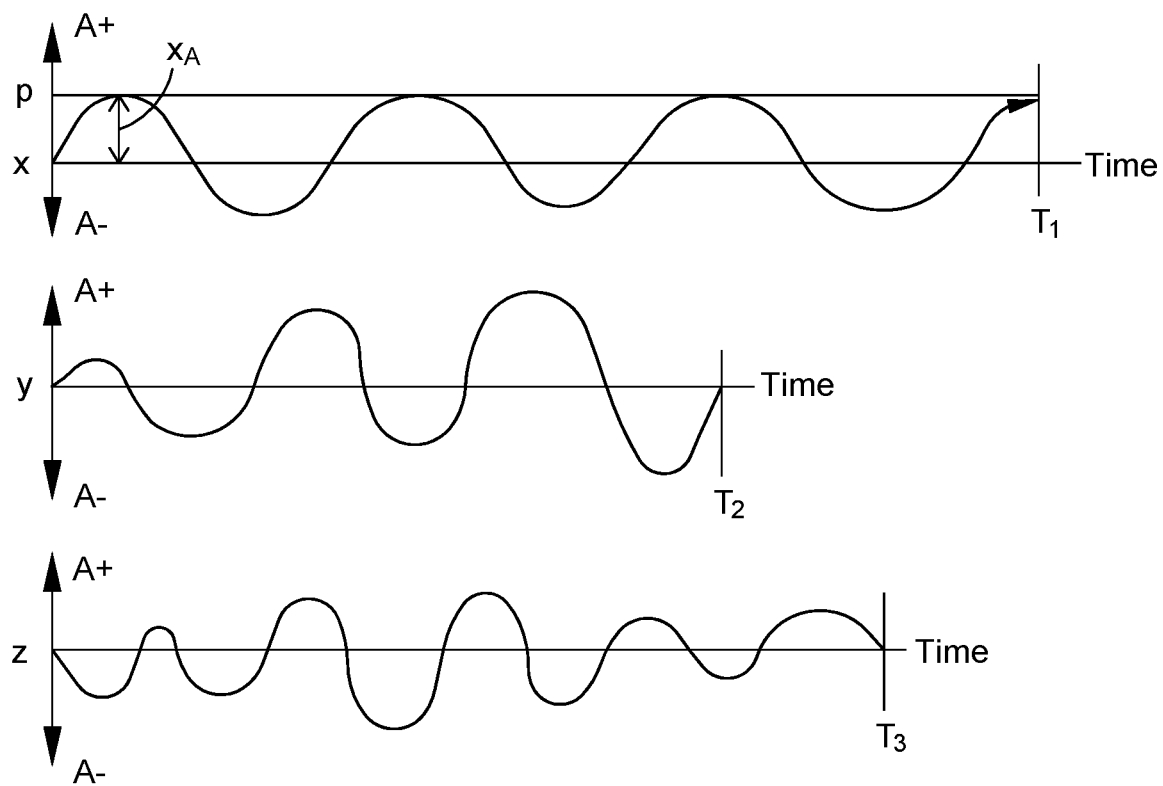
FIGS. 4A-C are diagrams which illustrate aspects of movement of haptic stimulator in accordance with the present invention.

In one embodiment, as illustrated in FIG. 3, the haptic stimulation device 24 is movable in the x, y and/or z directions relative to the reference point P, but preferably in a manner that, when the x direction is generally perpendicular to a desired stopping plane (such as a surface of the human body) or where the x direction is generally parallel to a desired direction of linear movement, the robotic mount 30 is configured to move so that the maximum travel of the haptic stimulation device 24 in the x direction does not exceed point P, but where the robotic mount 30 may otherwise move the haptic stimulation device 24 in the x direction. An example of such movement is illustrated in FIG. 4A, wherein the robotic mount 30 is configured to move the haptic stimulation device 30 back and forth in the x direction, but so that the maximum travel in the positive x direction does not exceed point P. It will be appreciated that the point P is simply a reference point, and that the "x" direction is simply a reference direction. The "x" direction need not, for example, be horizontal, but might be up and down/vertical or the like.

In the preferred embodiment, the robotic mount 30 can move the haptic stimulation device 24 in the y and/or z directions as well. FIG. 3 illustrates a configuration in which the haptic stimulation device 24 is moved in the x, y and z directions. For example, in a movement M1, the haptic stimulation device 24 is moved forwardly towards point P by a distance X1, from point X1a to point X1b. At the same time, the haptic stimulation device 24 may be moved in the z direction from point Z1a to point Z1b, and in the y direction from point Y1a to point Y1b.

As illustrated in FIG. 3, the haptic stimulation device 24 may be moved in various directions, such as illustrated by movements M2, M3 and M4, where some of these movements may be towards or away (in the x direction) from the point P (including point P or not including point P), and including movement in the y and z direction, wherein the amount (or distance) of movement in the y and/or z direction may change (be greater or less than) one another, and/or the change in x position.

Of course, in a sequence of movements, the movements M1, M2, M3 and M4 would have corresponding starting and end points (e.g. the starting point of motion M2 would correspond to the ending point of motion M1).

Figure 4B:
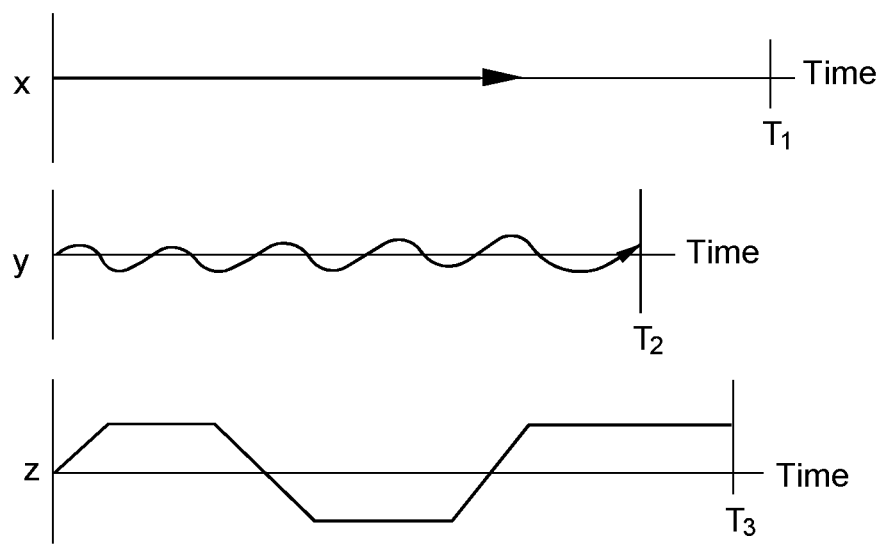
Figure 4C:
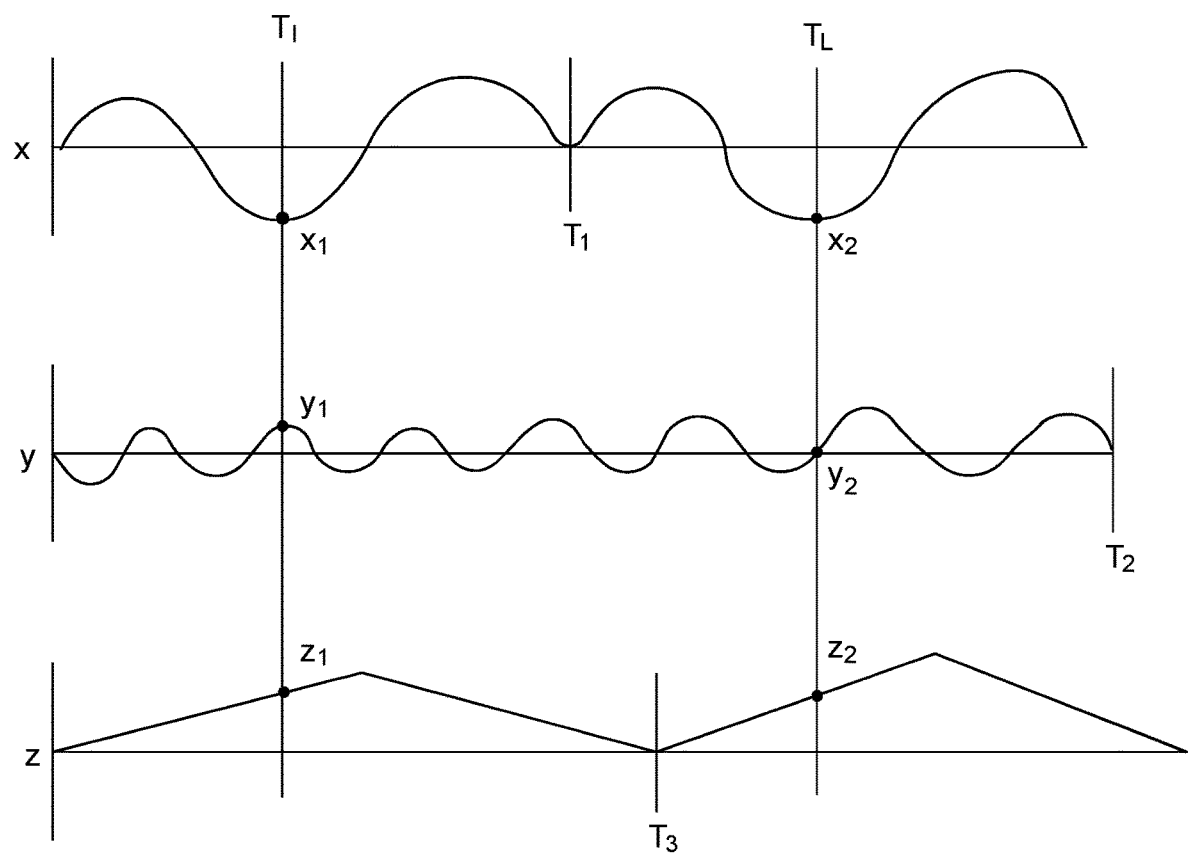

FIGS. 4A-4C better illustrate the independence of position and motion control over the haptic stimulation device 24. As illustrated, motion of the haptic stimulation device 24 may be reflected by movement in the x direction (positive or negative or zero), movement in the y direction (positive or negative or zero), and movement in the z direction (position or negative or zero). FIG. 4A illustrates a first example of plots of movement of the haptic stimulation device 24 in each of the x, y and z directions, vs. time. As indicated, the amount of movement in each direction, including relative to time, may vary. In this embodiment, the movement of the haptic stimulation device 24 in each direction is oscillatory (where the amplitude of movement and frequency may be the same or vary).

FIG. 4B illustrates a second example of plots of movement of the haptic stimulation device 24 in each of the x, y and z directions. This embodiment plot may, for example, be useful in moving the haptic stimulation device 24 along the surface of a human (such as along their back) rather than towards and away from that surface (as the position of the haptic stimulation device 24 does not change in the x direction, e.g. does not move towards or away from the contact surface).

FIG. 4B further illustrates that the motion of the haptic stimulation device 30 may vary. For example, in FIG. 4B, the motion in the x direction is zero, the motion in the y direction is a sinusoidal oscillation, while the motion in the z direction is a modified (ramped) square wave oscillation. Of course a wide range of movements may be implemented.

In one embodiment, while motion of haptic stimulation device 24 in the x, y and z directions is preferably entirely independent and independently controllable, in some embodiments, the movement of the haptic stimulation device 24 might be the same in one or more directions. For example, in one embodiment, movement of the haptic stimulation device 24 might be controlled to be the same in the y and z directions.

FIGS. 4A and 4B illustrate yet another aspect of the invention. In one embodiment, movement of the robotic mount 30 is controlled by a set of instructions, which instructions may define movement over a period of time. For example, the period of time T might be 30 seconds, 3 minutes or 30 minutes, or any other time period. Of course, the robotic mount 30 might be moved for a longer period of time, such as by repeating the base instructions more than one time (e.g. if the instructions generate robotic mount 30 movement for 3 minutes, if a user desired that the haptic stimulation device 24 be moved for 15 minutes, the user could cause the robotic mount 30 to move for 15 minutes by repeating the 3 minute sequence 5 times.

Moreover, as illustrated in FIGS. 4A and 4B, the instructions for movement of the haptic stimulation device 24 in each of the x, y and z directions need not have the same duration. For example, a set of instructions for movement of the haptic stimulation device 24 in the x direction might be for a time T1, whereas the instructions for movement in the y direction might be for a time T2 and for movement in the z direction, a time T3. Each of these times may be the same or different. When the times are different, operation of the robotic mount 30 mount for longer than the minimum defined time (T2 in the example illustrated in FIGS. 3A and B), requires that one or more of the instructions to be repeated. However, when the defined movements (amplitude over time) are not the same, this introduces variability into the motion or movement of the haptic stimulation device 24.

This feature is better illustrated in FIG. 4C. In this example, assume that the movement instructions in the x direction are for a time T1, in they direction for a time T2 and in the z direction for a time T3. Assuming that the robotic haptic stimulator 22 is to be operated for time T2, this requires the instructions for movement of the device in the x and z directions to be repeated one or more times. As shown, this repeating can cause the position of the haptic stimulation device 24 to not repeat to the same correlative x, y and z positions. For example, at time TI in FIG. 4C where the haptic stimulation device 24 is moved to its furthest "retracted" (i.e. in the negative x direction) position, the haptic stimulation device 24 is at position X1, Y1 and Z1, However, at time TL when the x direction instructions are repeated and the haptic stimulation device 24 is again at its further retracted position, the haptic stimulation device 24 is at position X2 (the same as X1), Y2, Z2. While positions X1 and X2 are the same, positions Y1 and Y2 differ, as do positions Z1 and Z2. Thus, as one aspect of the invention, variability in movement may be introduced by generating sequences of instructions for movement in each of the x, y and z directions, where the duration of those instructions is not the same, and the instructions are then fully or partially repeated.

Referring again to FIG. 1, as indicated above, in one embodiment, instructions may be generated and stored in the memory 62 associated with the robotic mount 30, for execution by the controller 60. For example, in one embodiment, the controller 60 is configured to executed code which is stored in the memory 62 and which causes the controller 60 to generate one or more control instructions. Those control instructions may, for example, comprise motor control instructions which are used to control the one or more motors M for causing the movable mount 34 to move. In one embodiment, the code which the controller 60 executes is configured to generate the motor control instructions based upon an input comprising one or more data sets. The data sets may comprise, for example, sets of coordinates such as those described above (e.g. sets of x, y and z direction coordinates which may themselves be generated or derived from one or more programs, formulas, plots or the like). For example, as indicated above, individual (x), (y) and (z) functions may be define x, y and z positions relative to time, and those functions may be used to generate data sets of (x, y, z) positions (whether stored as points having x, y and z coordinates, or as data subsets comprising x coordinates at designated times, y coordinates at designed times and z coordinates at designated times. These data sets may represent the "programs" which the robotic mount 30 may implement. In other embodiments, the data which is provided to the controller 60 may comprise one or more formulas which the controller 60 (or an external controller) uses to generate the data set of coordinates.

In one embodiment, a user may provide input to their user device 66 in order to control the robotic haptic stimulator 22. In one embodiment, input may be provide in relation to one or more graphical user interfaces which are displayed by the user device 66. In one embodiment, the graphical user interfaces might be configured as webpages displayed relative to an online service (such as supported by the server 70), or might be generated by an application running on the user's device 66. For example, in one embodiment, a user might download and install a robotic haptic stimulator control application onto their device 66. The user may then communicatively couple their device 66 to the robotic haptic stimulator 22, such as via a Bluetooth or Wi-Fi communication link.

The application may permit the user to provide inputs for controlling the robotic haptic stimulator 22. The application may permit, for example, the user to start and stop the robotic haptic stimulator 22, define a run-time of the robotic haptic stimulator 22, and to select different programs. The programs might be designated with different indicators (names etc.) and have different characteristics and comprise defined sets of instructions for movement of the robotic mount 30 (and thus the haptic stimulation device 24). The programs might, for example, define different motions, different ranges of motion, different durations of motion, etc.

Further, a user may "program" the movement of the robotic mount 30 and associated haptic stimulation device 24. For example, in one embodiment, the user might be permitted to change the movement control instructions, such as by changing the movement plots such as illustrated in FIGS. 4A and 4B. For example, a user might be permitted to select different movement functions (sinusoidal, square wave, modified square wave, ramp, etc.) and/or modify those functions, including by changing amplitude and/or time features thereof (for example, a user might be permitted to use a touch-screen to drag a displayed function to increase or decrease the time T, increase or decrease the amplitude, etc.). The user may then save the user-created program (and might save it under a new name).

When the memory 62 stores existing programs, a user's selection of an existing program may simply result in the controller 60 executing the stored program. If the user modifies an existing program or creates a new one and desires to execute that program, the program may be transmitted to the robot mount 30 for storage in the memory 62 and then execution by the controller 60. Of course, similar functionality might be implemented by a user via a workstation 68 or the like.

In accordance with another aspect of the invention, placement or movement of a robotic mount 30, and preferably one or more objects mounted to the mount 30, may be controlled based upon location information regarding another object. As one example, as described above, movement of a haptic stimulation device 24 may be controlled in relation to a point P. The point P may be associated with a human body. In one embodiment, information regarding a human's body, and particularly the location of one or more parts of that body, may be obtained and provided to the robotic haptic stimulator 22, for use in controlling the position of the associated robotic mount 30 (and thus the haptic stimulation device 24 in the embodiment illustrated in FIG. 2).

In one embodiment, location information regarding an object may be obtained using one or more detectors. Such detectors might comprise one or more range capturing devices, such as RADAR, LIDAR (light detection and ranging) or similar systems (now known or later developed).

For example, as illustrated in FIG. 1, a LIDAR system 72 may be utilized to scan an object. The information from the scan may be used to determine the relative location of the object, or portions thereof, such as relative to the robotic mount 30 (or the haptic stimulation device 24 or other object being moved by the robotic mount).

As one example, the LIDAR system 72 may be used to determine the location of a user's back, including portions of the back, relative to the robotic mount 30. One of the locations determined by the scan may be designated as point P in the embodiment described above. The robotic mount 30 may then be moved appropriately relative to the point P.

For example, the output of the LIDAR scan might be provided to the user's device 66, the workstation 68 or the like. The output of the scan may be displayed as an image. The user may select a location on the scan/image to be designated point P (and may change or move that point P from time to time). The coordinates of point P may then be determined from the selection relative to the scan. This location information may then be utilized to determine a default location for the robotic mount 30 (including in relation to the haptic stimulation device 24 or other object being moved thereby.

As one example, referring to FIG. 4A, assume that the current location of the haptic stimulation device 24 is point S (x,y,z) (such as determined by the controller 60). In the embodiment illustrated in FIG. 4A, the starting point of operation of the robotic mount 30 is for the haptic stimulation device 24 to be at a point PS (x, y, z) where x=P−Xa (e.g. the designated point P, less the maximum value of x during movement of the haptic stimulation device 24, whereby upon maximum movement of the haptic stimulation device 24 in the x direction, the haptic stimulation device 24 does not move past point P in the x-direction), and where y=P(y) and z=P(z) (in other words point PS has an x value which is the x value of point P less Xa, a y value which is equal to the y value of point P, and a z value which is equal to the z value of point P. The controller 60 (or external device) then moves the robotic mount 30 and associated object (e.g. haptic stimulation device 24) to point PS from point S by knowing the location of points S and PS (from the above calculation). The controller 60 may then execute the movement illustrated in FIG. 4A, such as based upon the illustrated program, to move the haptic stimulation device 24.

Of course, the location of point P might be updated from time to time, such as by rescanning the object (such as when the point P might move, such as when the human subject/user is moving).

The principles of operation just described may be applied to robotic mounts 30 which are being used to move other objects, particularly in different locations or in relation to other moving or movable objects. For example, assume that the robotic mount 30 is being used to move a farm implement for coupling to a tractor (such as by raising the coupler portion of the farm implement for coupling to the tractor). In that event, the location of the tractor may be slightly different each time the implement is to be connected to the tractor, such as due to variations in the farmer backing up the tractor relative to the implement. The present invention may be used to determine the location of the tractor and/or the coupler thereof, in relation to the robotic mount 30, and the farm implement being moved thereby. The location information may be used to control the robotic mount 30 so that it precisely moves the farm implement into connection with the tractor.

In one embodiment, movement of the haptic stimulation device 24 may be patterned after the movement of one or more other objects, and/or might be synchronized with other information. For example, one or more image capture devices may capture the movement of one or more physical objects. The captured video may be analyzed to detect and determine the movement of the object, such as in the x, y and z directions. That determined movement may be used to generate a corresponding set of control instructions or a "program" that is used by the controller 60 to move the robotic mount 30 in essentially the same manner (e.g. to duplicate the motion). The same principle may be applied to generating control instruction based upon analyzing other video, such as movement of actors in films, videos and the like.

In some embodiments, motion of the haptic stimulation device 24 (via movement of the robotic mount 30) might be synchronized with other information, such as video, sound or a combination thereof. For example, if the robotic haptic stimulator 22 has been programmed to duplicate the movement of an object in a video, the movement of the robotic haptic stimulator 22 may be synchronized so that its duplicated movement occurs in unison (at the same time or close in time) to the when the object(s) in the video engage in the same motion. As one example, in a movie, a first actor may move to touch a second actor. This motion may be analyzed and control instructions may be generated to control the robotic haptic stimulator 22 so that it moves the haptic stimulation device 24 in the same manner, including from one position to another in which it touches the user. This motion may be synchronized to the video so that while the user views the video, the robotic haptic stimulator 22 effectuates a physical re-production of the displayed movement/act.

As another example, the robotic haptic stimulator 22 (and thus the haptic stimulation device 24) might be programmed to move while music is playing. The movement of the haptic stimulation device 24 might also be controlled based upon information about the music, such as there the speed of movement of the haptic stimulation device 24 increases with the speed of the music, the amplitude of movement of the haptic stimulation device 24 increases based upon an amplitude of the music, etc.

In one embodiment, a user might upload a video and/or audio file to their user device 66 and/or to the workstation 68 or server 70, for analyzing and creation of an instruction file which is then provided to the controller 60 for execution. Time codes, such as described in U.S. Pat. No. 10,764,544, also invented by the inventor herein and incorporated by reference herein, might be used to synchronize the movement of the robotic haptic stimulator 22 with the video and/or audio.

Currently, robotic devices are often programmed with a 'home' position, which comprises a particular position of the robotic device. At the conclusion of operation of the robotic device, whether naturally or as a result of a fault, error or malfunction, the robotic device is configured to move to its home position.

In an embodiment of the invention, in order to prevent undesired (and potentially harmful) motion of a haptic stimulation device 24 from a desired position to an undesired position associated with a home position of a robotic mount 30, the robotic mount 30 is preferably configured to "freeze" in the event of a fault, default, malfunction, or in the event a user desires to stop the robotic mount 30. In any of these events, instead of the robotic mount 30 moving back to a 'home' position, the controller 60 causes the robotic mount 30 to immediately stop moving or "freeze" in its current position (regardless of the then current position, which may vary).

In one embodiment, a safety and/or consent control may be provided. The safety and/or consent control may be implemented by the controller 60 or by the controller and an external device, such as the user device 66. In one embodiment, an input, such as in the form of a consent, may be required in order to operate the robotic haptic stimulator 22, or to maintain it in operation. In one embodiment, when a user couples or pairs their user device 66 with the robotic haptic stimulator 22, the user may be required to provide an input to the user device 66 (such as to a touch screen thereof, such as displayed by an associated control application), in order for the user to utilize the robotic haptic stimulator 22. In other embodiments, a user might be required to provide input in other manners, such as to an input device associated with the robotic haptic stimulator 22 (which input device is not illustrated).

In one embodiment, operation of the robotic haptic stimulator 22 might also case if the user does not provide continued input of approval, or if the user provides a "stop" input. Such an input might be made by the user device 66, or by another input device. For example, a push-button might be configured to communicate with the controller 60, where the robotic haptic stimulator 22 only operates so long as the user continues to press the push-button (otherwise, the robotic mount 30 might immediately freeze or cease operation in the manner described above), or the robotic haptic stimulator 22 might be configured to stop if the user presses such a button.

Of course, the operation of the robotic haptic stimulator 22 might be controlled in other manners, including by voice command or the like.

In one embodiment, a means may be provided for verifying the identity of the user and input from the user. For example, in one embodiment, the robotic haptic stimulator 22 (or an external device or system in communication therewith, such as the user's device) might be configured to identify the user. Then inputs may be verified as being provided by that user. For example, the control application associated with a user's device 66 might be configured to receive a fingerprint of the user. When the user provides a later "stop" or "consent" input, the application may be configured to re-read the user's fingerprint associated with that input and compare it against the user's earlier fingerprint to ensure that the input came from the user. Likewise, the user might provide a voice command to their user device 66, and the voice command might be compared to a stored voice command or otherwise be analyzed to determine if it is a voice command of the user (and not another person).

It will be appreciated that a system of the invention may comprise multiple robotic haptic stimulators 22, or the use of multiple robotic haptic stimulators 22. In such a system, multiple individual robotic mounts each having an associated haptic stimulation device, may be used at the same time. In some embodiments, the individual robotic mounts may be used to move haptic stimulation devices in the same manner, while in others, the individual robotic mounts might move haptic stimulation devices at the same time or at differing times, including in different manners/positions.

It will be appreciated that the size and shape of the robotic haptic stimulator, including the robotic mount, may vary, such as depending upon the desired use. The robotic haptic stimulator may be powered in various manners, including by one or more batteries, a wired electricity source, etc.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A robotic haptic stimulator comprising:
a controller;
a memory;
a robotic mount comprising a base, and a movable mount connected to said base, said movable mount including a head, said head movably positionable in three-dimensional space defined by an x axis, a y axis and a z axis which are orthogonal to one another;
at least one motor configured to move said movable mount;
a haptic stimulation device connected to said head of said robotic mount so as to be movable by said robotic mount in three-dimensional space;
one or more sets of data stored in said memory, each set of data defining x position coordinates, y position coordinates and z position coordinates for said robotic mount relative to time, relative to a reference point in said three-dimensional space, said reference point associated with a human body and located on a designated one of said axes; and
machine-readable code stored in said memory and configured to cause said controller to utilize one of said sets of data to generate control instructions to cause said one or more motors to move said movable mount in a motion defined by said set of data, resulting in movement of said haptic stimulation device in three-dimensional space, including movement thereof towards and away from said reference point in a direction corresponding to said designated one of said axes, wherein a maximum range of said movement of said haptic stimulation device in said direction towards said reference point is limited to the location of said reference point on said designated one of said axes, and wherein, when said direction is generally parallel to a desired direction of linear movement, the robotic mount is configured to move so that the maximum travel of the haptic stimulation device in said direction does not exceed said reference point.

2. The robotic haptic stimulator in accordance with claim 1 wherein said robotic mount comprises a 6-axis robot.

3. The robotic haptic stimulator in accordance with claim 1 wherein said haptic stimulation device comprises a sex stimulation device.

4. The robotic haptic stimulator in accordance with claim 1 wherein said haptic stimulation device is detachably connected to said head of said robotic mount.

5. The robotic haptic stimulator in accordance with claim 1 wherein said x position coordinates are defined by a first function, said y position coordinates are defined by a second function, and said z position coordinates are defined by a third function.

6. The robotic haptic stimulator in accordance with claim 5 wherein said first function has a first time duration, said second function has a second time duration and said third function has a third time duration.

7. The robotic haptic stimulator in accordance with claim 1 wherein said reference point is determined using a light detecting and ranging device.

8. The robotic haptic stimulator in accordance with claim 1 wherein said set of data defines x, y and z position coordinates synchronously to audio for presentation by an audio device and/or to video for presentation by at least one video display, during movement of said haptic stimulator by said robotic mount.

9. A method of moving a haptic stimulator comprising the steps of:
    determining a reference point associated with a human body, said reference point positioned on an x axis of an assigned spatial coordinate system having said x axis, a y axis, and a z axis orthogonal to one another, and said reference point having x, y and z coordinates;
    defining an x direction control function;
    defining a y direction control function;
    defining a z direction control function;
    utilizing said x function to generate x values as a function of time, a highest of said x values not exceeding said x coordinate of said reference point;
    utilizing said y function to generate y values as a function of time;
    utilizing said z function to generate z values as a function of time;
    utilizing a controller to generate motor control instructions corresponding to said generated x, y and z values;
    utilizing said motor control instructions to cause one or more motors to move a robotic mount comprising a base, a movable mount connected to said base, said movable mount comprising a head, and said haptic stimulator connected to said head resulting in movement of said haptic stimulation device in three-dimensional space, including movement thereof towards and away from said reference point in a direction corresponding to said x axis, wherein a maximum range of said movement of said haptic stimulation device in an x direction corresponding to said x axis and towards said reference point is limited to the location of said reference point on said x axis, wherein, when said x direction is generally parallel to a desired direction of linear movement, the robotic mount is configured to move so that the maximum travel of the haptic stimulation device in said x direction does not exceed said reference point.

10. The method in accordance with claim 9 further comprising the steps of determining a location of one or more portions of an object, said reference point associated with said object.

11. The method in accordance with claim 10 wherein said location is determined using a light detection and ranging device.

12. The method in accordance with claim 9 wherein one or more of said x, y and z functions are oscillatory.

13. The method in accordance with claim 9 further comprising storing said x, y and z values in a memory associated with said controller.

14. The method in accordance with claim 9 wherein said steps of defining said x function, said y function and said z function comprise receiving at least one input from a user to a mobile communication device.

15. A robotic haptic stimulator comprising:
    a controller;
    a memory;
    a robotic mount comprising a base, and a movable mount connected to said base, said movable mount including a head, said head movably positionable in three-dimensional space defined by an x axis, a y axis and a z axis which are orthogonal to one another, wherein said x axis extends generally orthogonal to a plane associated with a human body, wherein a reference point is located on said x axis at the intersection of said plane, said reference point having an x value;
    at least one motor configured to move said movable mount;
    a haptic stimulation device connected to said head of said robotic mount so as to be movable by said robotic mount in three-dimensional space;
    one or more sets of data stored in said memory, said one or more sets of data defining x position coordinates, y position coordinates and z position coordinates for said robotic mount relative to time, wherein a maximum value of said x position coordinates does not exceed said x value of said reference point; and
    machine-readable code stored in said memory and configured to cause said controller to utilize one of said sets of data to generate control instructions to cause said one or more motors to move said movable mount in a motion defined by said set of data, resulting in movement of said haptic stimulation device in three-dimensional space, including movement thereof towards and away from said human body, wherein a maximum range of said movement of said haptic stimulation device in a direction corresponding to said x axis does not exceed said plane, and wherein, when said direction is generally parallel to a desired direction of linear movement, the robotic mount is configured to move so that the maximum travel of the haptic stimulation device in said direction does not exceed said reference point.

* * * * *